T. SIMMONS.
CHURN.
No. 177,431. Patented May 16, 1876.
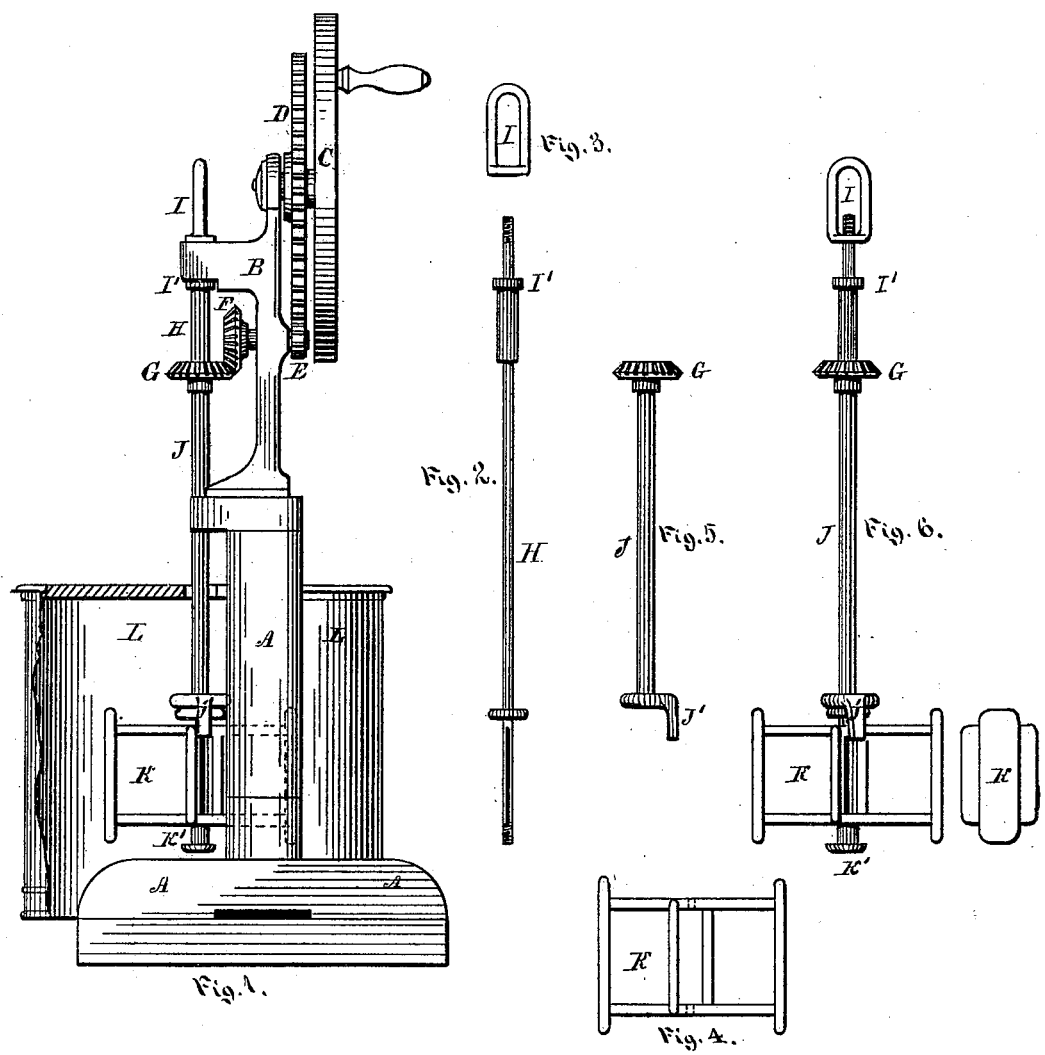

UNITED STATES PATENT OFFICE.

THOMAS SIMMONS, OF HARTFORD, CONNECTICUT.

IMPROVEMENT IN CHURNS.

Specification forming part of Letters Patent No. 177,431, dated May 16, 1876; application filed April 10, 1876.

*To all whom it may concern:*

Be it known that I, THOMAS SIMMONS, of Hartford, in the county of Hartford and State of Connecticut, have invented certain new and useful Improvements in Churns; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My invention relates to churns or machines for producing butter from milk or cream. It has for its object the production of a better article, and with greater rapidity, than has heretofore been manufactured.

My invention consists in the construction and arrangement of the several parts, as will be hereinafter described.

In the accompanying drawing, Figure 1 shows an elevation of my improved churn, with part of the tub removed in order to show the interior parts. Figs. 2, 3, 4, 5, and 6 are separate views of details, that will be hereinafter described.

A is the frame of the machine. It supports the standard B, to which is attached the working parts of the churn. C is a fly-wheel, to which is attached a crank, for operating the churn by hand. D and E are a geared wheel and pinion, for multiplying the motion. F and G are bevel-gear wheels, for communicating motion from the horizontal shaft of the pinion E to the vertical shaft or tube J. H is an interior tube, upon which J revolves. It is held to the standard B by means of a hand-nut, I, and a shoulder, I', which has a flat side resting against the standard, to prevent H from turning. K is a fan or dasher, which turns freely on the lower end of the tube H, and is held on by the removable nut K'. A dog, J', on the lower end of the tube J engages with the dasher K and turns it. The interior tube H is provided with one or more openings at its lower end, opposite the dasher, and is open at the top, so that air can pass through it. L is the tub or vessel which holds the milk or cream.

The operation of my invention is as follows: The liquid is placed in the tub L, and the wheel C turned by means of its handle, which gives a rapid rotary motion to the dasher K. The liquid is thrown outward, which produces a partial vacuum near the middle, and draws the air downward through the tube H into the liquid, so as to mix with it. This furnishes an abundant supply of oxygen, and rapidly forms the butter.

The dasher K, and the parts to which it is attached, can be readily removed from the churn by unscrewing the nut I, and the dasher itself can be removed from the tube H by unscrewing the nut K'.

What I claim as my invention is—

1. The construction, combination, and arrangement of the stationary interior aerating-tube H, the nut I for locking it to the frame, the exterior driving-tube J, and the revolving dasher K, substantially as herein described.

2. The combination of the frame A B and the geared wheels C D E F G with the driving-tube J and its dog J', for operating the revolving dasher K, substantially as herein described.

THOMAS SIMMONS.

Witnesses:
THEO. G. ELLIS,
ORVILLE PHELPS.